United States Patent [19]

Greene et al.

[11] Patent Number: 5,457,268

[45] Date of Patent: * Oct. 10, 1995

[54] SELECTIVE OXIDATION CATALYSTS FOR HALOGENATED ORGANICS

[75] Inventors: Howard L. Greene, Mogadore; Balachandran Ramachandran; Sougato Chatterjee, all of Akron, Ohio

[73] Assignee: The University of Akron, Akron, Ohio

[*] Notice: The portion of the term of this patent subsequent to Jan. 4, 2011 has been disclaimed.

[21] Appl. No.: 144,125

[22] Filed: Oct. 27, 1993

Related U.S. Application Data

[60] Continuation-in-part of Ser. No. 1,398, Jan. 6, 1993, Pat. No. 5,276,249, which is a division of Ser. No. 699,695, May 14, 1991, abandoned, which is a continuation-in-part of Ser. No. 23,017, May 14, 1990, abandoned.

[51] Int. Cl.⁶ .............................. A62D 3/00; C01B 7/07
[52] U.S. Cl. .............................. 588/207; 502/66; 502/79; 423/259; 423/659; 423/239.1; 423/240 R; 588/206
[58] Field of Search ........................ 423/239, 240, 423/259, 659; 502/79, 66; 588/206, 207

[56] References Cited

U.S. PATENT DOCUMENTS

| | | | |
|---|---|---|---|
| 3,004,908 | 10/1961 | Hazeldine | 204/163 |
| 3,218,363 | 11/1965 | Hazeldine | 260/648 |
| 3,989,806 | 11/1976 | Hyatt | 423/488 |
| 3,989,807 | 11/1976 | Johnston | 423/488 |
| 4,330,513 | 5/1982 | Hunter et al. | 423/245 |
| 4,345,983 | 8/1982 | Wan | 204/158 R |
| 4,358,428 | 11/1982 | Fujita | 423/239 |
| 4,423,024 | 12/1983 | Wolford | 423/437 |
| 4,916,096 | 4/1990 | Hoek et al. | 502/66 |
| 5,219,814 | 6/1993 | Kirker et al | 502/66 |
| 5,276,249 | 1/1994 | Greene et al. | 588/240 |
| 5,314,853 | 5/1994 | Sharma | 502/66 |

*Primary Examiner*—Asok Pol
*Attorney, Agent, or Firm*—Oldham, Oldham & Wilson, Co.

[57] ABSTRACT

The invention relates to a process and a catalyst composition for the destruction of volatile organic compounds (VOCs). The process includes the step of contacting the VOCs with an oxygen-containing gas in the presence of a catalyst which is a metal-exchanged, metal-impregnated aluminosilicate zeolite with at least one exchanged metal in the zeolite being selected from the group consisting of Ti, V, Cr, Co, Ni, Cu, Fe, Mo, Mn, Pd, and Pt, and at least one impregnated metal in the zeolite being selected from the group consisting of Ti, V, Cr, Mn, Fe, Co, Ni, Cu, Mo, Pd and Pt, and wherein the difference between the exchanged metal and the impregnated metal varies the temperature necessary to promote oxidation of the compounds and for a contact time sufficient to oxidize the compounds. The process reaction temperature can vary from about 100° C. to about 650° C. and the contact time can vary from about 0.01 to 20 seconds. Preferredly, the reaction temperature is from about 150° C. to about 450° C. and the contact time is from about 0.1 to 1.0 seconds. The $CO/CO_2$ ratio and the $Cl_2/HCl$ ratio in the gaseous effluent can be varied through selection of at least two impregnating metals with at least one exchanged metal in the aluminosilicate zeolite or by the use of at least one impregnating metal with at least two exchanged metals in the aluminosilicate zeolite.

18 Claims, 8 Drawing Sheets

△ Co-Y MONOLITH
□ Co-Y/CA MONOLITH
● Cr-Y/CA MONOLITH
◆ Mn-Y/CA MONOLITH
◇ Co-Y/CA PELLETS
■ Co-Y/CA/SILBOND PELLETS
○ COMMERCIAL Cr₂O₃ PELLETS

SPACE VELOCITY FOR PELLETS = 4934 (l/hr.)
SPACE VELOCITY FOR MONOLITHS = 2858 (l/hr.)

SELECTIVE OXIDATION CATALYSTS FOR HALOGENATED ORGANICS

REFERENCE TO RELATED APPLICATIONS

This application is a continuation-in-part of U.S. application Ser. No. 08/001,398, filed Jan. 6, 1993, now U.S. Pat. No. 5,276,249, which is a divisional application of U.S. application Ser. No. 07/699,695 filed May 14, 1991, now abandoned, which is a continuation-in-part of earlier U.S. application Ser. No. 07/523,017 filed May 14, 1990, now abandoned.

TECHNICAL FIELD

This invention relates to metal-exchanged, metal-impregnated zeolite catalysts and to zeolite-based catalysts where multiple ion-exchanged and/or impregnated metals are present, with the ability to selectively influence the effluent gas composition in the oxidative destruction of halogenated organics. The catalysts can be supported or unsupported, and optionally contain a binder. The oxidative destruction of hazardous halogenated organics includes chlorinated hydrocarbons, fluorinated hydrocarbons, and fluoro-chloro carbons (CFC's) comprises burning the halogenated organics in the presence of said catalysts in an excess of oxygen or an oxygen containing gas mixture such as air.

BACKGROUND OF THE INVENTION

Halogenated organics, including volatile and non-volatile chlorinated, fluorinated and chloro-fluoro hydrocarbons, represent a considerable health and environmental risk. The destruction of these compounds normally requires high temperature oxidation in the presence of a supported catalyst such as chromium oxide supported on alumina or other types of supports. Hunter et al. in U.S. Pat. No. 4,330,513 has reported a process using a fluid bed reactor and chromium oxide catalyst impregnated on alumina for a process for burning catalytically chlorinated hydrocarbons including polychlorinated biphenyls (PCB). His apparatus requires a continuously fluidized bed of catalytic particles and is accomplished at a temperature range between 460° C.–745° C.

In U.S. Pat. No. 4,423,024 Wolford described the oxidation of saturated aliphatic chlorinated hydrocarbons to carbon dioxide and hydrogen chloride over a molecular sieve catalyst in the temperature range between about 180° C. to about 400° C. The catalyst was made of any type of molecular sieve type catalyst including such catalysts as zeolites and other shape selective or shape restricted catalytic compositions.

In U.S. Pat. No. 3,989,806, Hyatt teaches the use of a copper exchanged zeolite in a process to recover chlorine values from essentially perchlorinated hydrocarbons. This reaction involves the controlled oxidation of the chlorinated hydrocarbons in such a way as to optimize the recovery of chlorine gas. The invention was primarily geared toward the recovery of chlorine from the bottoms (high boiling by-products) produced during certain chlorination reactions.

In U.S. Pat. No. 3,989,807, Johnston described the use of chromium impregnated supports for a process to recover chlorine values from chlorinated organics especially perchlorinated organics. Like Hyatt, this process was geared toward recovering chlorine primarily from perchlorinated hydrocarbons in a temperature range from below 500° C. or typically below 450° C.

The above catalysts and processes involve either the use of exchanged zeolites for oxidation of chlorinated organics or the use of metal-exchanged zeolites or metal-impregnated zeolites for the recovery of chlorine from essentially perchlorinated hydrocarbons. Further, the above processes dealt mostly with fluidized reactors and fluidizable catalysts. Therefore, the catalysts were normally in the form of pure zeolite powders or finely divided particulates not suitable for fixed bed reactors.

Although zeolites (U.S. Pat. No. 4,423,024) were used to destroy chlorinated organics, exchanging the natural catalytic sites of a zeolite can so alter the catalytic behavior of the zeolite as to shut down reaction pathways that would have occurred without exchange. Thus, the mere fact that the unexchanged zeolite could be used to destroy chlorinated hydrocarbons, albeit less efficiently compared with the catalysts of the present invention, in no way suggests that exchanged zeolites would function analogously.

While the prior art does disclose several catalyst compositions which could be used to destroy volatile organic compounds (VOCs), the prior art does not teach how to selectively influence the composition of the effluent gas stream of the process other than by means of temperature control. To date, the need has existed for a catalytic method which can alter the $CO/CO_2$ ratio in the effluent gas without resorting to temperature variations. The need to control the $CO/CO_2$ ratio is important for example, in synthesis gas (syngas) applications which may exist downstream of the halogenated organic oxidation reactor. Syngas applications would favor high $CO/CO_2$ ratios, while other applications may require the ratio to be minimized.

SUMMARY OF THE INVENTION

It is an object of this invention to provide a novel, low temperature, highly selective, highly active catalyst for the oxidative destruction of halogenated organics, said catalyst being supported or unsupported, and comprising a metal-exchanged and metal-impregnated zeolite, which through manipulation of the catalyst composition can selectively alter the $CO/CO_2$ ratio at a constant operating temperature.

It is another object of this invention to provide a novel, low temperature, highly selective, highly active catalyst for the oxidative destruction of halogenated organics, said catalyst being supported or unsupported, and comprising a metal-exchanged, metal-impregnated zeolite, which through manipulation of the catalyst composition can selectively alter the $Cl_2/HCl$ ratio at a constant operating temperature.

A further object of this invention is to provide a process for manufacturing the catalyst of the present invention.

A still further object of this invention is to provide a process for the oxidative destruction of halogenated organics on the catalysts of the present invention in a temperature range from about 100° C. to about 650° C. and preferably from about 150° C. and 450° C.

Other aspects and objects of this invention will be explained and discussed in the following specification.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

This invention relates to a metal-exchanged, metal-impregnated zeolite catalysts and to multiply metal-exchanged and/or multiply metal-impregnated zeolite catalysts, for the destruction of halogenated organics. The catalyst can be supported or unsupported, comprising from 0 weight percent, hereinafter wt. %, to about 95 wt. % of a binder, from about 10 wt. % to about 95 wt. % of a metal(s)-exchanged zeolite, and from about 0.2 wt. % to about 12 wt. % of an impregnating metal(s) compound, said percentage being calculated as the metal(s) loading on an oxide basis, where the metal(s) in the metal(s)-exchanged zeolite can be selected from the representative and illustrative group consisting of Ti, V, Cr, Co, Ni, Cu, Fe, Mo, Mn, Pd and Pt and the impregnating metal(s) compound(s) can be selected from the representative and illustrative group consisting of compounds of Ti, V, Cr, Mn, Fe, Co, Ni, Cu, Mo, Pd, and Pt. Additionally disclosed is a process for making said catalysts and a process for the oxidative destruction of hazardous halogenated organics including chlorinated hydrocarbons, fluorinated hydrocarbons, and fluoro-chloro carbons (CFC's) which comprises burning the halogenated organics in the presence of said catalyst and the excess of oxygen or an oxygen containing gas mixture such as air.

The optional binder can be selected from the representative and illustrative group consisting of alumina, silica, alumina-silica, cordierite, titania, zirconia, vanadia, and other inorganic materials used as binding agents. However when present, binders such as Silbond™ or other binders which form high surface area matrices are preferred. While not wishing to be bound by theory, it is believed that the binder, when present, will act as a bonding agent to secure the metal-exchanged zeolite onto the support, and also acts as a surface which will bond with the impregnating agent.

The metal(s) in the metal(s)-exchanged zeolite can be selected from the representative and illustrative group consisting of Ti, V, Cr, Co, Ni, Cu, Fe, Mo, Mn, Pt and Pd. The impregnating metal(s) compound(s) can be selected from the representative and illustrative group consisting of compounds of Ti, V, Cr, Mn, Fe, Co, Ni, Cu, Mo, Pd, and Pt. Typically, the impregnating metal(s) compound(s) is a water soluble metal compound where the metal is available as an ion in any allowable oxidation state. When the catalyst is deposited on a support, the support can be made of any standard support material such as, but not restricted to, alumina, silica, silica-alumina, cordierite, titania, zirconia, other similar inorganic supports and extrudates containing zeolites. The support can be in any desirable shape including, but are not restricted to, honeycomb, monolith, pellets, rings, spheres, saddles, ceramic foams, extrudates, or other types of shaped support. Honeycombs and monoliths are preferred. Depending upon reaction temperatures employed, it is also possible to use polymeric support material, such as Dowex® resins and Amberlite® resins, and also carbon.

Catalyst Preparation

In a first catalyst preparation embodiment of the invention, the metal(s)-exchanged, metal(s)-impregnated zeolite or molecular sieve, the terms being used interchangeably in this application, of the instant invention can be prepared by a process which comprises the steps of: (1) exchanging a zeolite with a metal(s) to form a metal(s)-exchanged zeolite; (2) drying the metal(s)-exchanged zeolite; (3) calcining the metal(s)-exchanged zeolite, (4) optionally adding a binder to the metal(s)-exchanged zeolite; (5) drying the metal(s)-exchanged zeolite/binder combination, if the binder is present; (6) calcining the metal(s)-exchanged zeolite/binder combination, if the binder is present; (7) impregnating the metal(s)-exchanged zeolite to form a metal(s)-exchanged zeolite, metal(s)-impregnated catalyst; (8) drying the metal(s)-exchanged, metal(s)-impregnated catalyst; and (9) calcining the metal(s)-impregnated, metal(s)-exchanged zeolite catalyst to form an active catalyst for the destruction of halogenated organics.

In a second catalyst preparation embodiment of the invention, the metal(s)-exchanged, metal-impregnated zeolite of the instant invention can be prepared by a process which comprises the steps of: (1) exchanging a zeolite with a metal to form a metal(s)-exchanged zeolite; (2) drying the metal(s)-exchanged zeolite; (3) calcining the metal(s)-exchanged zeolite, (4) washcoating the metal(s)-exchanged zeolite catalyst onto an inorganic support with or without a binder; (5) drying the washcoated metal(s)-exchanged zeolite/support combination; (6) calcining the washcoated metal(s)-exchanged zeolite/support combination; (7) impregnating the metal(s)-exchanged washcoated zeolite/support to form a metal(s)-exchanged zeolite, metal-impregnated catalyst; (8) drying the metal(s)-exchanged, metal-impregnated catalyst; and (9) calcining the metal-impregnated, metal(s)-exchanged zeolite catalyst to form an active catalyst for the destruction of halogenated organics.

In a third catalyst preparation embodiment of the invention, the metal(s)-exchanged, metal-impregnated zeolite of the instant invention can be prepared by a process which comprises the steps of: (1) exchanging a zeolite with a metal to form a metal(s)-exchanged zeolite; (2) drying the metal(s)-exchanged zeolite; (3) calcining the metal(s)-exchanged zeolite, (4) dry-mixing the metal(s)-exchanged zeolite powder with a finely powdered impregnating metal compound, (5) adding a binder to form a metal(s)-exchanged zeolite, finely powdered impregnating metal compound powder/binder slurry, (6) drying the metal(s)-exchanged zeolite, finely powdered impregnating metal compound/binder slurry; and (7) calcining the metal(s)-exchanged zeolite, finely powdered impregnating metal compound catalyst to form an active catalyst for the destruction of halogenated organics.

Zeolitic Catalyst Metal-Ion Exchange Process

Exchanging a zeolite with a metal, which is typically a water soluble metal salt with the metal available as an ion, to form a metal(s)-exchanged zeolite, normally involves first treating the zeolite with ammonia in an aqueous environment to convert protonic sites to ammonium sites; the ammonium sites facilitating the metal exchange reaction. Normally, water soluble metal salts are used in the exchange reaction because the exchange reaction involves the replacement or exchange of one ion for another ion in the channels or cages of the zeolite. The exchange process is normally carried out until exchange equilibrium is attained which can range from about six hours to about 24 hours or more, with 10 to 20 hours being preferred.

Metal(s)-exchanged Zeolite Catalyst Washcoating

Washcoating is a technique for surface deposition of an active catalyst species onto the surface of an inert support. The coating technique is normally performed by dipping a support in a slurry of the active catalyst and optionally a binder. The binder, when necessary, allows efficient adherence of the catalytic agent to the support surface. Drying and calcining completes the washcoat bonding process resulting in a surface coated support. Of course, it should be recognized that the coverage of the surface will not be complete, and second, that pores formed by the binder can expose zeolite or support.

The amount of the catalytic composition, washcoated or otherwise bonded to the surface of a given support, will depend in a large part on the end use of the particular supported catalysts. However, typically, the catalyst composition does not make up more than 50% of the weight of the final catalyst, i.e., 50% catalyst and 50% support. Preferably, the catalyst compositions make up no more than 25% of the combined weight. However, supported catalysts can be made where the catalyst composition makes up more than 50% of the weight or less than 25% of the weight.

Metal(s)-Ion Exchanged Zeolite Catalyst Impregnation

Impregnation is a technique where a surface is saturated with a metal ion. The impregnating metal compound(s) can be selected from the representative and illustrative group consisting of compounds of Ti, V, Cr, Mn, Fe, Co, Ni, Cu, Mo, Pd, and Pt. Typically the impregnating metal(s) compound(s) can be any reagent containing the desired metal in a usable form, such as, but not restricted to, water soluble salts of these metals where the metal ion is in any chemically allowable oxidation state. The impregnation involves immersion or soaking of the washcoated catalyst in a solution containing the impregnating metal compound, and optionally a binder. The impregnated catalyst is then subjected to a drying and a calcining step. The impregnation step is normally performed in an aqueous medium which requires the impregnating metal compound to be water soluble to some extent. Previously exchanged metal ions are neither lost nor are they replaced during this impregnation process. Furthermore, impregnation sites yield very different catalytic properties from metal(s)-exchanged sites.

Metal(s)-exchanged, Metal(s)-Impregnated Zeolitic Catalyst Drying

The drying steps are well known drying and are typically performed at a temperature sufficient to promote drying and for a time sufficient to attain drying at a given temperature. Of course, there is an inverse relationship between temperature of drying and time of drying, i.e., as the temperature goes up the time of drying goes down. However, too rapid a drying rate can adversely affect ultimate catalyst properties. Thus, the time and temperature of drying are typically balanced to give the best overall properties. In the present invention, the drying time is usually from about 2 hours to about 48 hours or longer and the drying temperature is usually from about 95° C. to about 250° C. The dried catalyst is then calcined at a temperature from about 400° C. to about 750° C. for a time sufficient to render the catalyst in a stable form from about 2 hours to about 48 hours or longer. Since zeolites are involved, temperatures much above 750° C. may cause destruction of the crystalline nature of the zeolite. The thermal destruction of synthetic zeolite is well known in the art.

Non-Supported Catalysts

There are several methods which can be employed to prepare non-supported metal(s)-exchanged, metal-impregnated catalysts. In one embodiment, commercially available zeolite pellets are exchanged with appropriate metal ions. Subsequent to appropriate drying and calcining, these metal(s)-ion exchanged zeolite pellets, are impregnated with a suitable impregnating agent(s), and optionally with a binder. After appropriate drying and calcination steps, followed by sieving to appropriate screen size, a non-supported catalyst has been prepared.

In a second embodiment, commercially available zeolite powders are exchanged with appropriate metal ions. Subsequent to appropriate drying and calcining, these metal(s)-ion exchanged zeolite powders, are dry-mixed with a suitable finely powdered impregnating metal compound(s) and slurried with a binder. After appropriate drying and calcination steps, followed by sieving to appropriate screen size, a non-supported catalyst has been prepared.

In a third embodiment, non-supported catalysts can also be prepared by simply taking the catalytic mixture (metal(s)-impregnated and metal(s)-exchanged zeolite) and shaping the mixture into a form in a wetted state (inclusion of sufficient water to render the mixture formable, i.e., not too fluid or not too dry, as is well known in the art), and drying and calcining the form. This process results in a stable, unsupported catalyst. This method may also require the inclusion of extrusion aids such as inorganic or organic plasticizers well known in the art or pore forming additives also well known in the art.

In yet a fourth embodiment, non-supported catalysts can be prepared by a method which involves the preparation of a ceramic foam, comprising a mixture of the metal(s)-impregnated and the metal(s)-exchanged zeolite. Thus, the above mixture is sprayed or otherwise coated onto an organic form. The coated form is dried and then calcined, which destroys the organic form, leaving behind a ceramic remnant of the organic form, i.e., a ceramic foam. It should be recognized that other techniques well known in the art can also be used to form the unsupported catalyst of the present invention.

Ion Exchange/Impregnation Reagents

The specific type of metal reagents which can be used for either exchanging the zeolite or for impregnating the catalysts include, but are not restricted to, chlorides including all possible chlorides of each metal, oxides, phosphates, sulfates, acetates, formates, nitrates, bromides, carbonates, hydroxides, and other similar water soluble salts of metals selected from the representative and illustrative group consisting of Ti, V, Cr, Mn, Co, Ni, Cu, Fe, Mo, Mn, Pd and Pt. However, it should be recognized that non-aqueous methods can also be employed to exchange the zeolite or impregnate the washcoated support.

Zeolites

The zeolites or molecular sieves, the terms being used interchangeably, usable in this invention include pellets and powders, such as Na-Y and H-Y, and are commercially available from Union Carbide, Linde Division, under the tradename Y-52, and Y-82 respectively. However Y-zeolites from any other manufacturer can be utilized under similar conditions, along with other types of zeolites, such as A, L, O, P or X zeolites, silicalites, ZSM series, or naturally occurring zeolites such as faujasites or mordenites.

Supports

A variety of supports can be used as substrates for the catalysts of the present invention. The supports include, but are not restricted to, typical inorganic supports such as alumina, aluminum oxide, silica, silicates, silica-aluminas, aluminum-silicates, titanias, cordierite and other similar supports and combinations thereof. These inorganic supports can be in any number of shapes and structures depending on the exact requirements of the reactor or process in which they will be incorporated. In one embodiment of the invention, a preferred support shape is the honeycombed type shape. Each honeycomb pattern selected is again a matter of discretion depending to a large extent on the reactor and process variables. Other shaped forms are also usable including, but not restricted to, spheres, Intalox™ saddles, Super Intalox™ saddles, Bed saddles, slotted ring Tower Packing™, Raschig Rings™, cross-partition rings, Lessing rings, balls, pellets, bricks, ceramic foams and monoliths. It has also been possible to use metals, such as stainless steel as a support material. Depending upon reaction temperatures employed, it is also possible to use polymeric support material, such as Dowex® resins and Amberlite® resins, and also carbon.

Reactants

The types of halogenated organics for which the novel catalysts of this invention are able to oxidize include, but are not restricted to, the following: chlorinated hydrocarbons such as chlorinated methanes including chloromethane, dichloromethane, chloroform, carbon tetrachloride; chlorinated ethane including chloroethane, dichloroethane, trichloroethane, tetrachloroethane and higher chlorinated ethanes; other chlorinated alkanes; chlorinated ethylenes including monochloroethylene, dichloroethylene, trichloroethylene, and tetrachloroethylene; chlorinated propylene and other chlorinated alkenes and dienes; chlorinated aromatics including chlorinated benzenes; perchlorinated hydrocarbons including hexachlorobenzene, hexachlorobutadiene, hexachloroethane, chlorinated styrenes, dioxin, polychlorinated biphenyls, and other chlorinated hydrocarbons and organics; fluorinated hydrocarbons from gaseous to high molecular weight ones, such as fluorinated methanes including fluoromethane, difluoromethane, fluoroform, carbon tetrafluoride; fluorinated ethylene, 1-fluoroethylene, difluoroethylene, tri and tetra fluoroethylene; chlorinated/fluorinated hydrocarbons such as freons including difluorodichloroethane, fluorochloropropanes, CFC-12, CFC-11, CFC-113 and other similar CFC's.

Multiple Ion(s) Exchange and/or Impregnation

It should be appreciated that there are at least 15 different combinations of metals which are possible for catalysts having one metal(s)-exchanged in the zeolite and a second, the same or different, impregnated on the surface. It should also be appreciated that trimetallic compositions are also possible by either using two different metals during exchange or during impregnation. Four metal and higher mixed metal combinations are also possible.

Water Vapor Addition

Applicants have also found that the addition of water to the feed stream in an amount below the supersaturation point at the given temperature and pressure of the feed stream, is capable of effectively shifting the equilibrium concentration of chlorine gas produced during oxidation to hydrochloric acid according to the Deacon reaction shown below:

$$4\ HCl+O_2 \rightleftharpoons 2\ H_2O+2\ Cl_2$$

The invention will be made more clear by reference to an illustrative group of examples which describe the preparation of the catalyst and describe the types of results which are common in the use of these catalysts for the destruction of halogenated organics. All parts and percentages are by weight unless otherwise indicated.

Abbreviations

In the examples below, the following abbreviations will be used:

| | |
|---|---|
| CA | chromic acid |
| TCE | trichloroethylene |
| MeCl$_2$ | methylene chloride |
| Cr-Y | chromium exchanged Y type zeolite |
| Cu-Y | copper exchanged Y type zeolite |
| Co-Y | cobalt exchanged Y type zeolite |
| NA | no available results |
| CA | chromic acid |
| TCE | trichloroethylene |
| Silicalite | silicalite-type zeolite |
| Silicalite/CA | silicalite-type zeolite impregnated with CA |
| Cr-Y | chromium exchanged Y-type zeolite |
| Cr-Y/Pt | chromium exchanged, platinum impregnated Y-type zeolite |
| Cr-Pt-Y/Co | chromium and platinum exchanged, cobalt impregnated Y-type zeolite |
| Cr-Y/Pt/Co | Chromium exchanged, platinum and cobalt impregnated Y-type zeolite |

Examples

The following specific examples detail the best mode known to the applicant at the time of filing this application. It is envisioned that better modes of operation and/or catalysts may be developed subsequently and are to be considered as a part of this specification thereof insofar as they come within the scope of the claims.

Example #1

Preconditioning of Inorganic Support

This step is optional and is presented here only to indicate the manner in which the catalyst was prepared in full. A three-inch cordierite core was leached in a 1.5N aqueous $HNO_3$ solution at 95° C. for about two and a half hours, followed by washing with distilled water for 10 minutes at 95° C. This resulted in a core with a weight loss in the vicinity of 2–6%. The leached core was dried in an oven at 100° C. for 10–16 hours. It should be recognized that any other similar inorganic support including the ones previously listed can be substituted for the cordierite core.

Example #2

Preparation of a chromium-exchanged zeolite (Cr-Y)

89.77 grams of $NH_4Cl$ were dissolved in 445 ml of distilled water. 74.5 grams of Linde Y-82 (sometimes herein referred to as H-Y) molecular sieve powder was slurried in this solution. The slurry was heated to about 100° C. and an even mixing was accomplished by stirring it for two hours. The exchanged zeolite powder was filtered while hot and washed with distilled deionized water during filtration. This preliminary process results in an ammonium-exchanged zeolite powder. The ammonium-exchanged zeolite powder was slurried in approximately twice its weight of distilled deionized water (150 ml). Six weight percent of $Cr(NO_3)_3$, based on the weight of zeolite powder, was dissolved in approximately 300 times its weight of distilled deionized water. The dilute solution of the exchanging salt $Cr(NO_3)_3$, was added to the zeolite slurry and the resulting mixture was continuously stirred. In order to establish an exchange equilibrium, the stirring was continued over a period of 12–15 hours. After the required time period, the slurry was filtered and washed with distilled deionized water to remove all traces of soluble salts. The filtered zeolite powder was dried at 125° C. for two hours and then calcined at 550° C. over a period of 10–12 hours. The resulting zeolite aggregate was crashed to a fine powder and used for washcoated catalyst preparation. Although this example involves Cr exchange, the exact procedure can be used for the other metals taught herein. The only difference would be in the replacement of $Cr(NO_3)_3$ with a similar salt of either Ti, V, Co, Ni, Cu, Fe, Mo, Mn, Pd or Pt.

It should be recognized that the same technique as described above can be performed with any other inorganic support.

Example #3

Washcoating Cr-Y onto an Inorganic Support

Approximately 25% by weight, based on the amount of binder of the exchanged zeolite of Example 2, was slurried in 200 ml of Silbond-H-5™. The slurry was kept well mixed by continuous stirring. The weighed cordierite core, as prepared in Example 1, was dipped into the slurry and taken out. The cordierite channels were then partially cleared by blowing compressed air through them. The above procedure was repeated four times. Finally, the core was dried at 200° C. for two hours followed by calcination at 550° C. for 12–14 hours. Generally the core showed a weight gain of between 15% and 20% after the washcoating procedure.

It should be recognized that this same procedure may be repeated any number of times to increase the loading of the catalyst onto the inorganic support.

Example #4

Preparation of Cr-Y/CA Impregnated Catalyst

Approximately 6% salt solution was prepared by dissolving 20 grams of chromium oxide ($CrO_3$) in 300 ml of distilled deionized water. The catalyst as prepared in Example 3, was immersed into the chromic acid ($H_2CrO_4$) solution and kept there for about two hours. This solution was neutralized to a pH of 4.0 by adding 1N $NH_4OH$. Thereafter, the catalyst core was removed and dried at 200° C. for two hours. It was then calcined at 550° C. for 10–12 hours.

Although this example involves chromium impregnation, this procedure can be used for any of the other metals taught herein. The only difference would be in the replacement of chromic acid with a suitable water soluble or partially soluble salt of either Ti, V, Co, Ni, Cu, Fe, Mo, Mn, Pd and Pt.

It should be recognized that this same procedure may be repeated any number of times to increase the loading of the catalyst onto the inorganic support.

Example #5

Preparation of unsupported binderless Co-Y/CA Impregnated Catalyst Pellets

1/16" LZ-Y62 extrudates/pellets were obtained from Union Carbide Co. 100 grams of the Y-62 pellets were ammonium exchanged as per Example 2. The ammonium-exchanged zeolite pellets were slurried in approximately twice their weight of distilled deionized water (120 ml). 16 grams of $Co(NO_3)_2 \cdot 6H_2O$, based on 3.25 grams of Co per 100 grams of zeolite, was dissolved in approximately 300 times its weight of distilled deionized water. The dilute solution of the exchanging salt $Co(NO_3)_2$, was added to the zeolite slurry and the resulting mixture was continuously stirred at about 40°–50° C. In order to establish an exchange equilibrium, this stirring was continued over a period of 2–3 days. After the required time, the exchange solution was drained and the zeolite pellets were then dried at 125° C. for 2 hours followed by calcination at 550° C. over a period of 10–12 hours. This resulted in approximately 1.5–2.5 wt. % metal loading on an oxide basis. Although this example involves Co exchange, the exact procedure can be used for the other metals taught herein. The only difference would be the replacement of $Co(NO_3)_2$ by the suitable salt of the metal used.

Following the Co exchange, the Co-Y pellets were CA-impregnated by slurrying them in a 13 wt % solution of $CrO_3$ in water. The Co-Y pellets were immersed into the chromic acid solution at about 25° C. and kept there for 3–4 hours. This solution was neutralized to a pH of 4.0 by adding 1N $NH_4OH$. Thereafter the catalyst pellets were removed and dried at 200° C. for two hours. They were then calcined at 550° C. for 10–12 hours. The same procedure can be used to impregnate the exchanged zeolites with any other metals taught herein.

Example #6

Unsupported Co-Y/CA Impregnated Catalysts from Zeolite Powder with Silica Binder Co-Y was prepared by Co exchanging LZ-Y82 zeolite powder as in Examples 2 and 5. Approximately 25% by weight, based on the mount of silica binder, was slurried in 68 ml of Silbond-H-5™. The slurry was well mixed by continuous stirring and heated to 40° C. for about 1 hour. After the required time period, the volatile part of the Silbond-H-5™ evaporated and the slurry became a thick paste. This zeolite/binder paste was dried at 200° C. for 2 hours followed by calcining at 550° C. for 10–12 hours. After calcining, the Co-Y/Silbond aggregate was crushed and sieved to 3/64" pellets.

These pellets were further CA-impregnated from a 13 wt % $CrO_3$ solution in water as described in Example 5. This solution was neutralized to a pH of 4.0 by adding 1N $NH_4OH$. Even though CA impregnation was carried out in this case, any other suitable metal salts can also be used to do the metal impregnation step.

Example #7

Preparation of Supported or Unsupported Co-Y Catalysts/ Impregnating Metal Powder (from zeolite powder, finely powdered impregnating metal compound and a silica binder)

Co-Y was prepared by Co exchanging LZ-Y82 zeolite powder as in Examples 2 and 5. Approximately 9.0 grams of Co-Y zeolite powder was dry-mixed with 0.55 grams of $Cr_2O_3$. After a suitable period of time, 15.0 grams of Silbond-H-5™ was added to the mixed powder to form a slurry. The slurry was well mixed by continuous stirring and heated to 40° C. for about 1 hour. After the required time period, the volatile part of the Silbond-H-5™ evaporated and the slurry became a thick paste. This metal(s)-exchanged zeolite/finely powdered impregnating metal compound/binder paste was dried at 200° C. for 2 hours followed by calcining at 550° C. for 10–12 hours. After calcining, the Co-Y/Cr$_2O_3$/Silbond aggregate was crushed and sieved to 3/64" pellets. Even though $Cr_2O_3$ was used in this case, any other suitable metal salts can be used for the dry mixing step.

Example #7

Preparation of Cr-Y Catalyst

The H-Y catalyst in the form of 1/16" pellets was first exchanged to the ammonium form before chromium exchange. An ammonium chloride solution (2.24 equivalent) was prepared by dissolving 120.5 g ammonium chloride in 1 liter of distilled water. 150 g of H-Y pellets were suspended in this solution and the solution stirred continuously at 50°–55° C. for 2 hr. Three such successive exchanges were performed on H-Y to ensure an ammonium exchange of about 70%.

For the chromium exchange, 25 g of chromium nitrate $(Cr(NO_3)_3 \cdot 9H_2O)$ was dissolved in 1 liter of distilled water to have a 0.3% (by weight) chromium concentration. This solution, which had a pH of 2.58, was neutralized to a pH of 4.0 by adding 1N $NH_4OH$. The $NH_4$—Y was then suspended in this solution and stirred continuously at 90° C. for 72 hours. After the exchange, the catalyst pellets were thoroughly washed and dried at 125° C. for 90 rain and then calcined at 500° C. for 12 hr to prepare the Cr-Y catalyst.

Example #8

Preparation of Cr-Y/Co

The impregnation of cobalt on Cr-Y catalysts, 50 g of $Co(NO_3)_2 \cdot 6H_2O$ was dissolved in 400 ml of distilled water. 20 g of Cr-Y was then suspended in this cobalt solution for 2 hr. The catalyst was then dried at 125° C. for 90 min and then calcined at 500° C. for 12 hr to prepare the Cr-Y/Co catalyst.

Example #9

Preparation of Cr-Y/Co/Pt

The impregnation of platinum on Cr-Y/Co was done by the method of incipient wetness. A Pt loading of 0.2% (by weight) was obtained, based on the solution uptake. 0.02 g of tetraamine platinum (II) chloride was dissolved in 10 ml of distilled water and 9.98 g of Cr-Y/Co was wetted by this solution. The catalyst was then dried at room temperature and was calcined at 500° C. (by gradual heating to this temperature, 1° C./min) for 12 hr to prepare Cr-Y/Co/Pt.

Example #10

Preparation of Cr-Pt-Y

The exchange of platinum on a previously exchanged Cr-Y zeolite was accomplished as follows. 0.03 g of tetraamine platinum (II) chloride was dissolved in 100 ml of distilled water. 9.97 g of Cr-Y was suspended in 900 ml of distilled water and the 100 ml of platinum solution was added dropwise. The solution was continuously stirred at room temperature for 12 hr. The catalyst was then washed with distilled water twice and then dried at room temperature. Calcination was then carried out at 500° C. (by gradual heating to this temperature, 1° C./min) for 12 hr to prepare the Cr-Pt-Y catalyst.

Example #11

Preparation of Cr-Pt-Y/Co

The impregnation of cobalt on Cr-Pt-Y catalysts was effected in a manner analogous to that described previously in Example #8 for immersion. The catalyst could have additionally been prepared using the incipient wetness technique of Example #9.

Example #12

Preparation of Pd-Y/Co

The catalyst was prepared by ion exchange of palladium with 1/16" H-Y pellets (LZY-84) received from UOP, followed by impregnation of cobalt by incipient wetness. 70.76 g of H-Y pellets were suspended in a solution of ammonium chloride prepared by dissolving 120.5 g of ammonium chloride in 1 liter of distilled water. Four successive exchanges were performed on the H-Y catalyst by contacting the H-Y pellets with fresh ammonium chloride solutions for 3 hr. durations at 80° C. The $NH_4$—Y pellets were then suspended in a palladium nitrate solution made by dissolving 1.5 g of $Pd(NO_3)_2 \cdot xH_2O$ in 1600 ml of distilled water. The exchange was performed at 80° C. for 72 hr. The catalyst was washed thoroughly with distilled water, dried at 90° C. for 4 hr. and calcined at 500° C. for 15 hr. From the batch of Pd-Y prepared, cobalt was impregnated by the method of incipient wetness. 2.35 g of $Co(NO_3)_2 \cdot 6H_2O$ was dissolved in 14 ml of distilled water. 15.37 g of Pd-Y pellets were immersed in the cobalt nitrate solution. The catalyst was dried at room temperature and then calcined at 500° C. for 15 hr.

Discussion

Applicants have found that metal(s)-exchanged, metal(s)-impregnated zeolites give rise to unique, highly active, very selective catalysts for the oxidative destruction of halogenated organics to the halo acid and carbon oxides (carbon monoxide and carbon dioxide). It is believed that these catalysts are novel in that they combine the cracking and oxidation capability of a metal(s)-exchanged zeolite, wherein the first catalytic site in the composition is in a channel or a cage of the zeolite, with the deep oxidation potential of a transition metal oxide, wherein the second catalytic site in the composition is on a surface of the combination. While not wishing to be tied to any theory, it is believed that this combination of first and second site interaction leads to highly active, very selective catalysts for the complete oxidative destruction of halogenated organics to the halo acid and carbon oxides.

Simultaneously, this invention produces a catalyst resistant to deactivation, common to pure zeolites, as caused by deposition of carbon in the catalyst channels and pores. Instead, the carbon is oxidized primarily to $CO_2$ and $CO$.

The importance of inter-site catalytic interaction is demonstrated by a comparison of a series of reaction runs using a catalyst as described in Example 4 for the destruction of trichloroethylene (TCE) to comparable data using a series of reaction runs using a catalyst as described in Example 3. The feed ratios as stated in the previous example are modified by the amount of water added to the feed.

The results of these runs are indicated in Tables 1 and 2 below.

destruction of the chlorinated hydrocarbon with high chlorine and carbon mass balances. Selectivities to hydrochloric acid and carbon oxides can be co-optimized to approach near quantitative yield of both, which would result in the suppression of the formation of chlorine gas and/or higher chlorinated hydrocarbons. The presence of water insures that the formation of hydrochloric acid is favored over the formation of chlorine gas by shifting the equilibrium of the Deacon reaction to the right:

$$2\ Cl_2 + 2\ H_2O \rightleftarrows 4\ HCl + O_2$$

FIGS. 1 to 6 describe a series of reactor runs using catalysts of Examples 4–6 and various volatile chlorinated hydrocarbon feeds including methylene chloride, carbon tetrachloride and tetrachloroethylene under varying conditions including variations in reaction temperature, and feed ratios. The feed ratio is the ratio of the number of carbon-chlorine bonds in the feed to the total number of carbon-chlorine bonds plus the total number of hydrogen atoms present in the feed mixture. In the case of methylene chloride the feed ratio is 0.5 (2 C—Cl bonds/(2 C—Cl bonds+2 hydrogen)). For carbon tetrachloride, the feed ratio

TABLE 1

Results of the oxidation of trichloroethylene using catalyst of Example 4.

| Feed Ratio | Feed Concentration (ppm) | Temp (°C.) | Water (ppm) | Conversion (%) | Cl Balance | C Balance |
|---|---|---|---|---|---|---|
| 0.08 | 751 | 400 | 13271 | 92.8 | 113.2 | 63.6 |
| 0.11 | 1073 | 375 | 12044 | 90.4 | 91.1 | 46.1 |
| 0.13 | 1176 | 350 | 11679 | 92.8 | 86.7 | 42.2 |
| 0.16 | 1344 | 300 | 10262 | 89.8 | 70.0 | 32.3 |

TABLE 2

Results of the oxidation of trichloroethylene using catalyst of Example 4.

| Feed Ratio | Feed Concentration (ppm) | Temp (°C.) | Water (ppm) | Conversion (%) | Cl Balance | C Balance |
|---|---|---|---|---|---|---|
| 0.09 | 851 | 250 | 12047 | 2.7 | 104.4 | 104.6 |
| 0.10 | 835 | 300 | 10653 | 11.5 | 105.6 | 103.2 |
| 0.12 | 1004 | 350 | 10918 | 36.1 | 98.2 | 96.6 |
| 0.11 | 989 | 400 | 11728 | 67.4 | 104.6 | 96.3 |
| 0.10 | 949 | 450 | 13454 | 87.9 | 102.3 | 83.7 |

Figure 1:
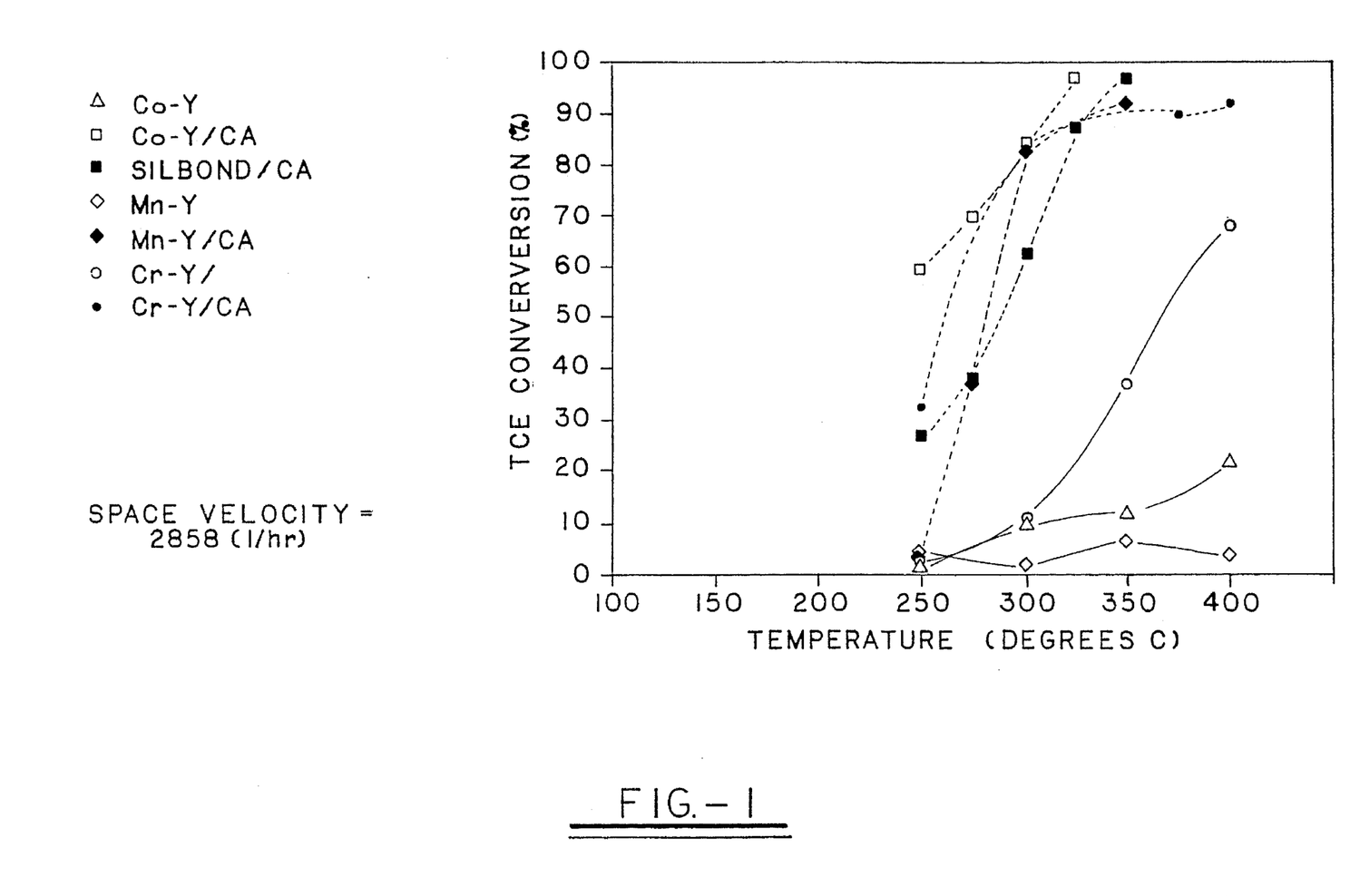
FIG. 1 is a plot of trichloroethylene (TCE) conversion vs. temperature for various catalyst monoliths at a space velocity of $2858^{-1}$/hr.

The data presented in this table show that the additional impregnated chromium sites of a catalyst prepared according to Example 4, greatly increase the catalytic activity at lower temperature. Thus, the catalytic activity of a catalyst according to Example 3, as shown in Table 2, exhibited only an 87.9% conversion at 450° C. while the catalyst according to Example 4, showed an 89.8% conversion at only 300° C. with nearly the same feed ratios. Additional evidence for this phenomenon is illustrated in FIG. 1. Comparing the curves for that of a metal(s)-exchanged zeolite, curves for Co-Y, Mn-Y, and Cr-Y, with those for Co-Y/CA, Mn-Y/CA, and Cr-Y/CA, quickly points out essential differences in catalytic activity by the addition of chromic acid.

It is apparent from the above data that the catalyst conditions can be selected to obtain nearly quantitative is 1.0 and for tetrachloroethylene the feed ratio is 1.0. Feed ratios less than the feed ratio for the pure chlorinated hydrocarbon evidence the addition of water to the feed. The lower the feed ratio (number value), the more added water.

As evidenced in FIG. 1, using TCE as a feed, in all instances, the addition of an impregnating metal, CA in these examples, dramatically improved the amount of conversion. At 250° C., the conversion observed for the non-impregnated monolithic analog was less than 10%. However, for the CA-impregnated counterparts, the minimum conversion was 25% and ranged as high as 60%.

Figure 2:
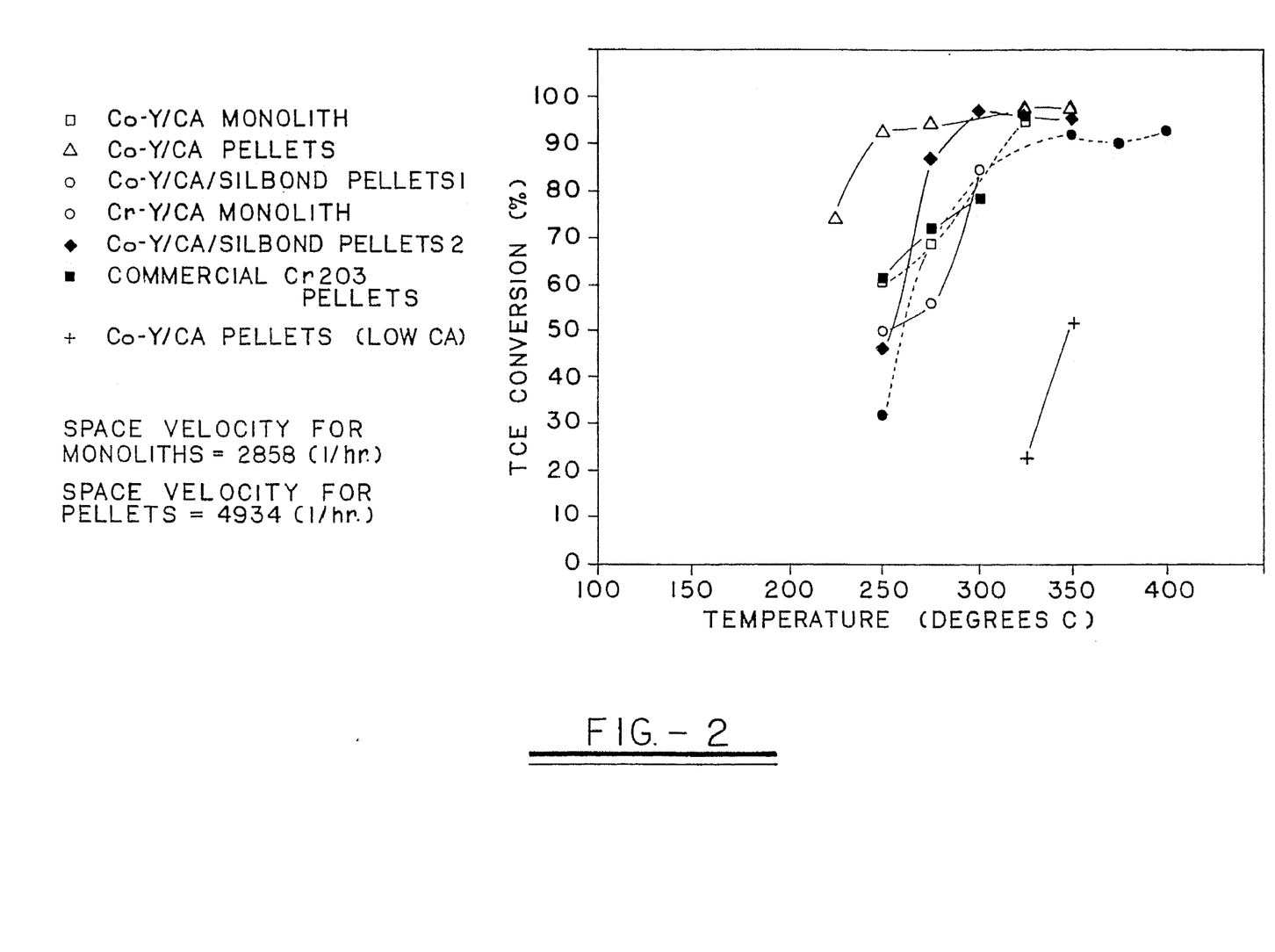
FIG. 2 is a plot of trichloroethylene (TCE) conversion vs. temperature for various catalyst monoliths and pellets using a space velocity of $2858^{-1}$/hr for monoliths and $4934^{-1}$/hr for pellets.
Figure 3:
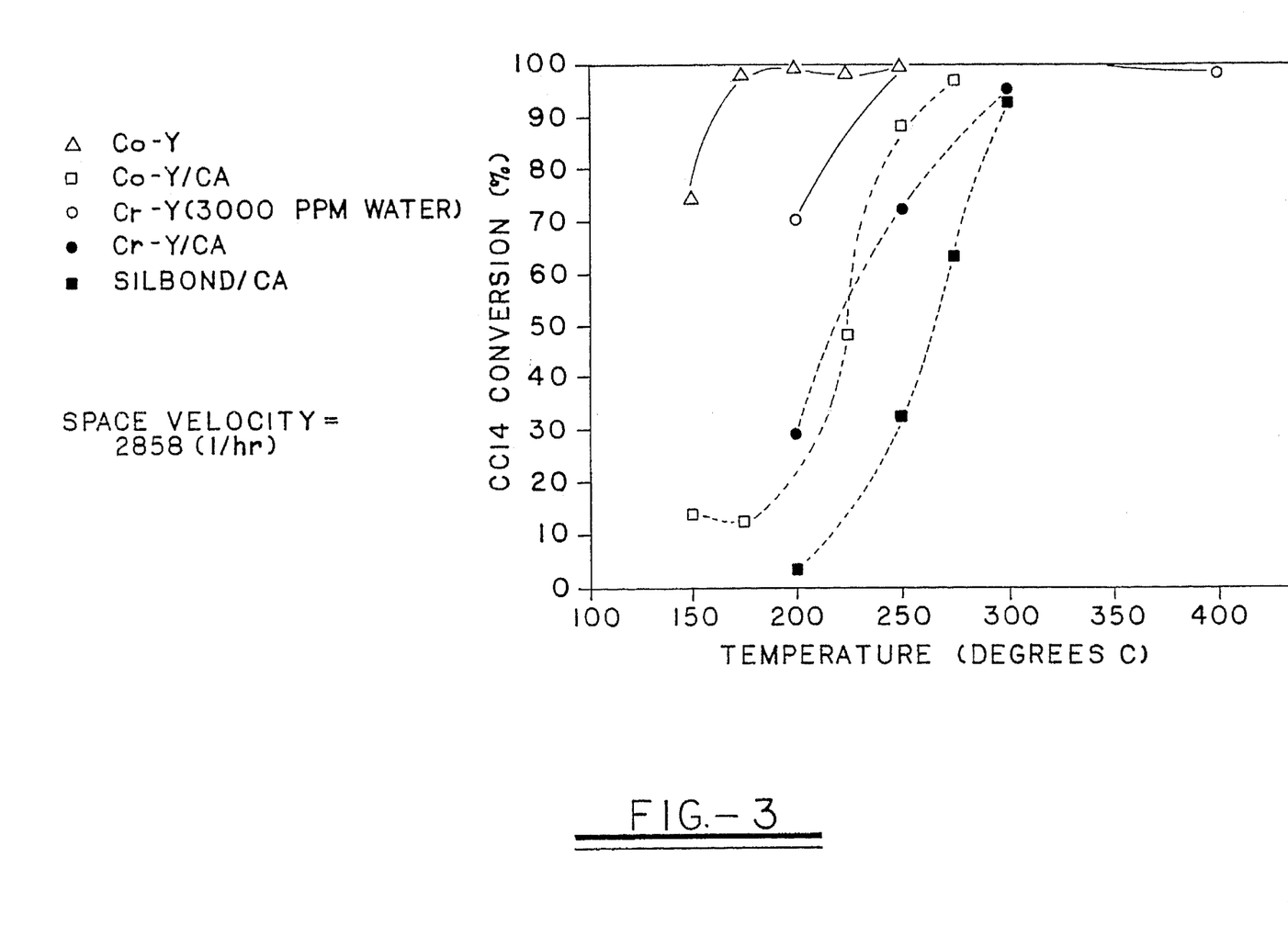
FIG. 3 is a plot of carbon tetrachloride conversion vs. temperature for various catalyst monoliths at a space velocity of $2858^{-1}$/hr.
Figure 4:
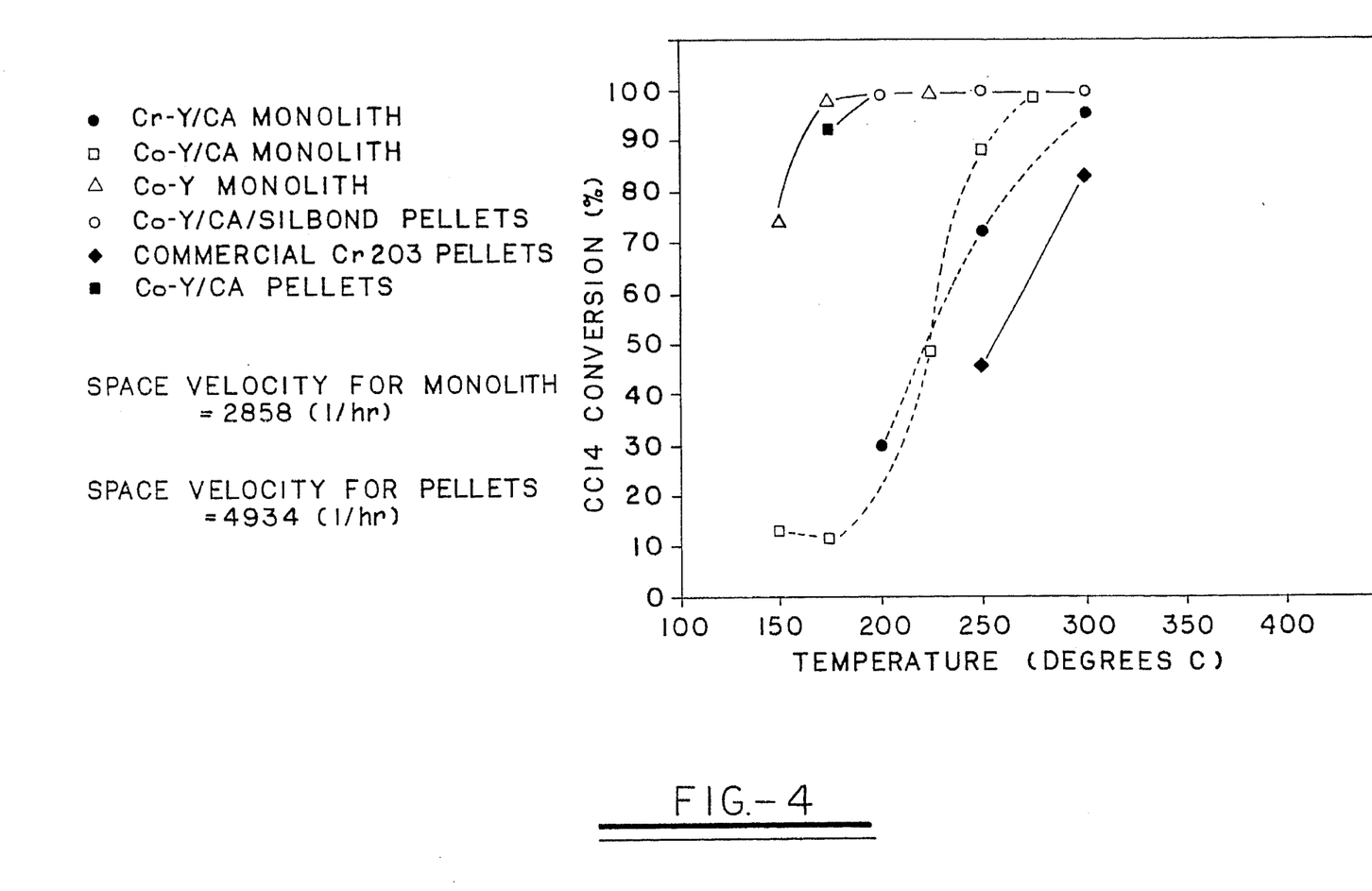
FIG. 4 is a plot of carbon tetrachloride conversion vs. temperature for various catalyst monoliths and pellets using a space velocity of $2858^{-1}$/hr for monoliths and $4934^{-1}$/hr for pellets.
Figure 5:
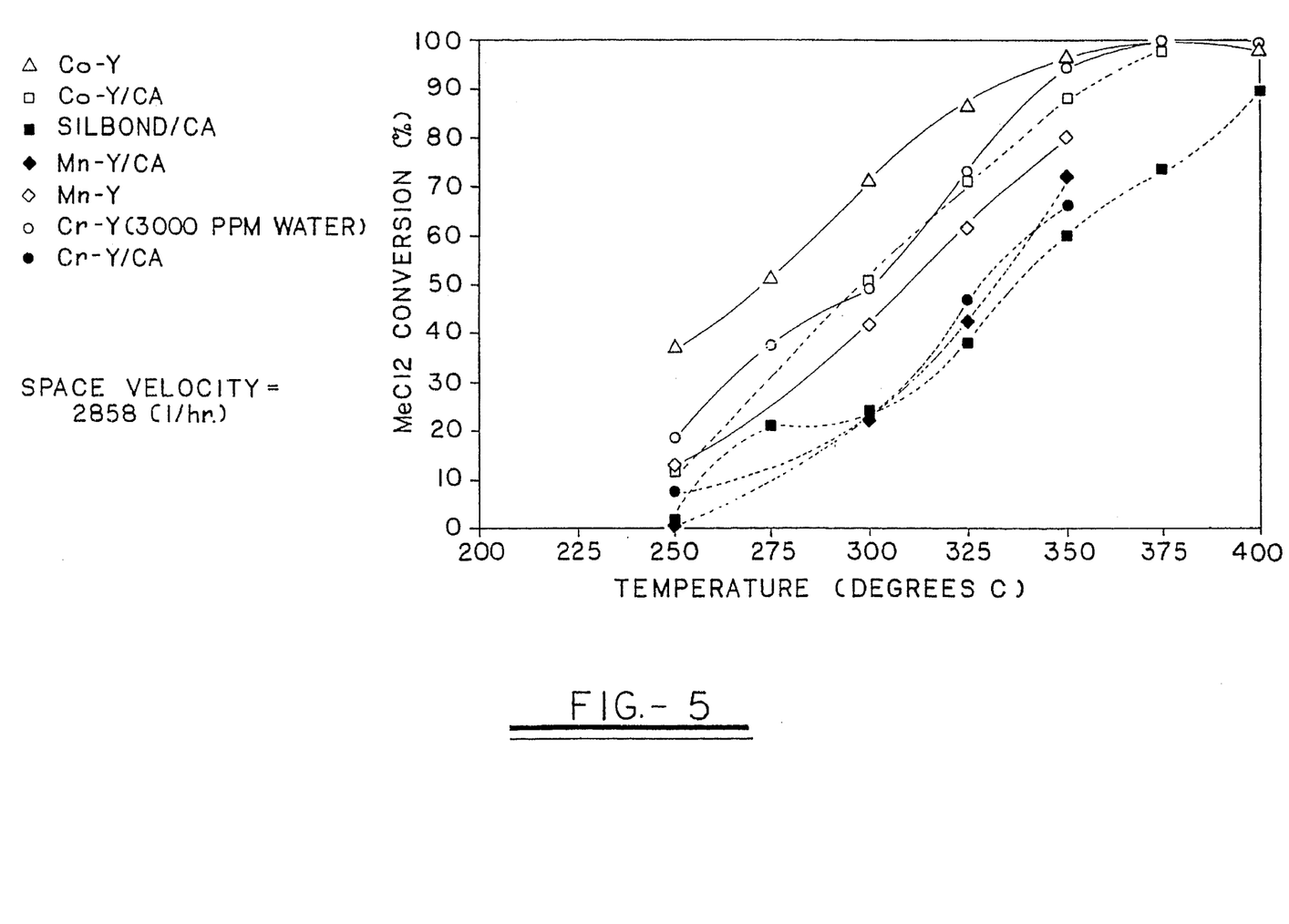
FIG. 5 is a plot of methylene chloride conversion vs. temperature for various catalyst monoliths at a space velocity of $2858^{-1}$/hr.
Figure 6:
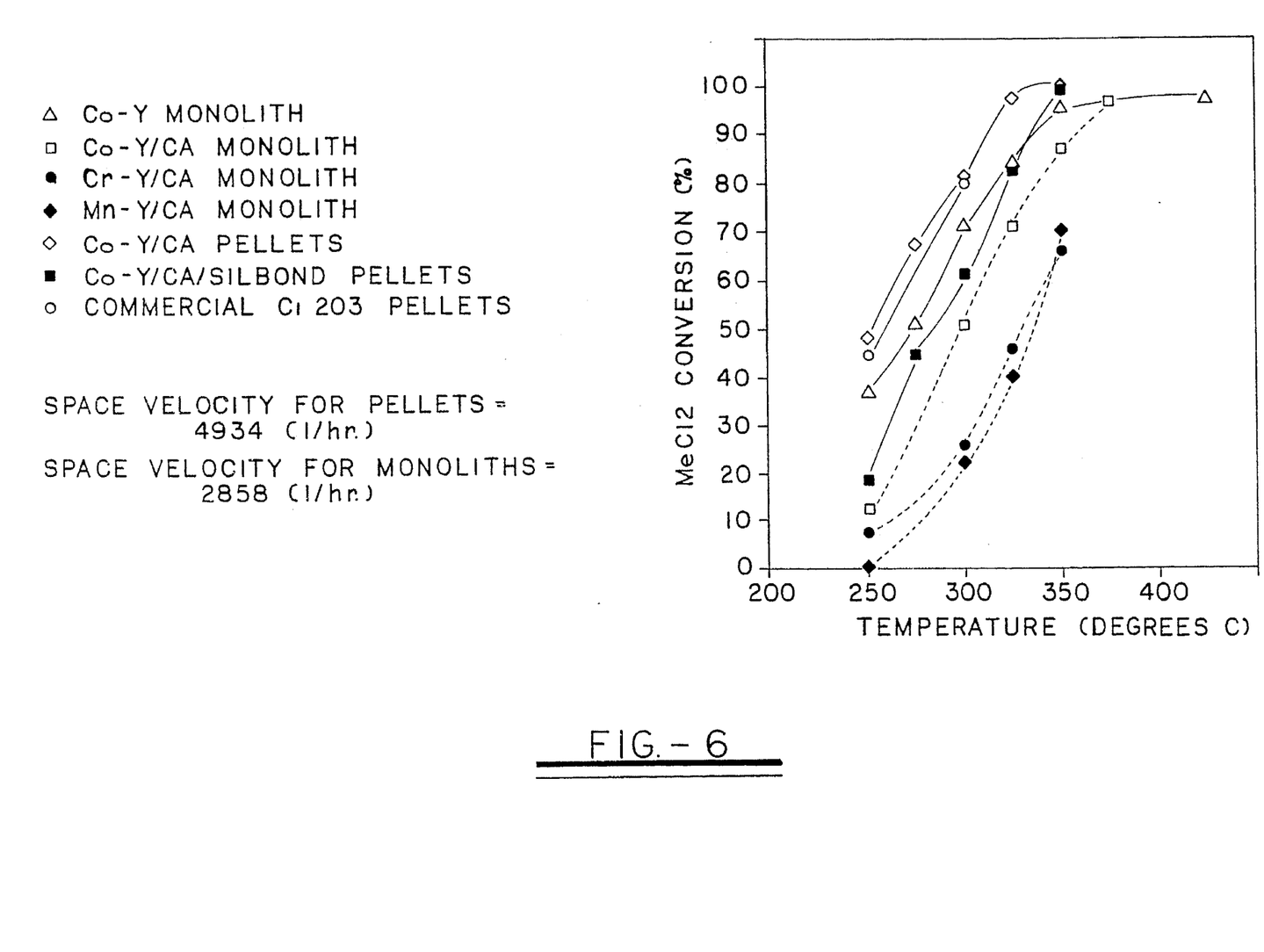
FIG. 6 is a plot of methylene chloride conversion vs. temperature for various catalyst monoliths and pellets using a space velocity of $2858^{-1}$/hr for monoliths and $4934^{-1}$/hr for pellets.

In FIG. 2, the ability of catalysts of the instant invention to oxidize chlorinated hydrocarbons in both pelletized and monolithic form is shown. It is noted that when the catalyst is comprised of Co-Y/CA pellets, exceptionally high oxidation conversion is experienced at temperatures between 200° C. and 250° C.

FIGS. 3,4 and FIGS. 5,6 provide comparable data using $CCl_4$ and $MeCl_2$ as the feedstocks. While the impregnated, exchanged zeolitic catalysts of the instant invention are not optimal for these feedstocks, it must be noted that chlorinated feeds do not typically occur in isolation. They almost universally occur as extremely complex mixtures of chlorinated moieties. These graphs do exhibit the fact that catalysts of the instant invention will work at low temperatures.

A large number of runs on various different types of catalysts based on the preparative procedures taught in Examples 1–6 are summarized in Table 3. Runs 1–9 use a CA-impregnated, Cr-Y washcoated cordierite monolith catalyst; runs 10–18 use a CA-impregnated Cr-Y doubly washcoated cordierite monolith catalyst; runs 19–26 use a doubly-impregnated Cr-Y washcoated cordierite monolith catalyst; runs 27–35 use a CA doubly-impregnated, Cr-Y doubly-washcoated cordierite monolith catalyst; runs 36–40 use a Co-Y treated cordierite monolith catalyst; runs 41–44 use a CA-impregnated, Co-Y washcoated cordierite monolith catalyst; runs 45–49 use a Cu-Y washcoated cordierite monolith catalyst; and runs 50–53 use a CA-impregnated, Cu-Y washcoated cordierite monolith catalyst. The conversion and product distribution associated with these runs are given in Table 3.

TABLE 3

| Run # | Feed | Feed Conc. (ppm) | Water Conc. (ppm) | T (°C.) | Reaction (%) | HCl | $Cl_2$ | $Cl_2$/HCl | CO | $CO_2$ | CO/$CO_2$ |
|---|---|---|---|---|---|---|---|---|---|---|---|
| Cr-Y/CA | | | | | | | | | | | |
| 1 | $MeCl_2$ | 1508 | 16589 | 250 | 7.9 | 25.6 | NA | | 3.3 | 1.0 | 3.30 |
| 2 | $MeCl_2$ | 1445 | 12500 | 300 | 25.3 | 49.2 | NA | | 3.5 | 3.4 | 1.03 |
| 3 | $MeCl_2$ | 1425 | 13317 | 325 | 46.1 | 44.2 | 0.9 | 0.02 | 3.5 | 6.3 | 0.56 |
| 4 | $MeCl_2$ | 1234 | 19997 | 350 | 66.5 | 63.2 | 2.4 | 0.04 | 64.9 | 11.3 | 0.57 |
| 5 | $CCl_4$ | 1012 | 11417 | 200 | 29.2 | 12.1 | 1.5 | 0.12 | ND | 12.8 | -0- |
| 6 | $CCl_4$ | 1077 | 16093 | 250 | 72.4 | 68.1 | 0.9 | 0.01 | ND | 38.9 | -0- |
| 7 | $CCl_4$ | 1137 | 13837 | 300 | 95.9 | 75.2 | 5.3 | 0.07 | ND | 50.1 | -0- |
| 8 | TCE | 862 | 12949 | 300 | 84.8 | 70.0 | 1.5 | 0.02 | 40.6 | 15.2 | 2.67 |
| 9 | TCE | 882 | 12346 | 250 | 32.1 | 30.8 | NA | | 22.7 | 12.9 | 1.76 |
| Cr-Y/CA double loading of Cr-Y | | | | | | | | | | | |
| 10 | $MeCl_2$ | 1304 | 6601 | 300 | 64.6 | 51.2 | 1.5 | 0.03 | 53.7 | 10.6 | 5.07 |
| 11 | $MeCl_2$ | 1105 | 6697 | 325 | 83.2 | 83.4 | 5.4 | 0.06 | 72.4 | 21.3 | 3.40 |
| 12 | $MeCl_2$ | 1247 | 6555 | 350 | 94.6 | 75.3 | 7.6 | 0.10 | 64.2 | 24.8 | 2.59 |
| 13 | $CCl_4$ | 856 | 13186 | 200 | 44.5 | 49.9 | 0.3 | 0.01 | 44.2 | 15.4 | 2.87 |
| 14 | $CCl_4$ | 860 | 10014 | 250 | 91.5 | 81.3 | 0.9 | 0.01 | 48.4 | 19.5 | 2.48 |
| 15 | $CCl_4$ | 914 | 10165 | 300 | 95.1 | 81.7 | 5.2 | 0.06 | 41.0 | 18.8 | 2.18 |
| 16 | TCE | 904 | 9296 | 250 | 90.7 | 70.8 | 0.7 | 0.01 | ND | 44.2 | -0- |
| 17 | TCE | 930 | 9895 | 275 | 85.1 | 60.0 | 1.1 | 0.02 | ND | 59.5 | -0- |
| 18 | TCE | 975 | 9757 | 300 | 87.4 | 68.8 | 2.1 | 0.03 | ND | 70.7 | -0- |
| Cr-Y/CA double loading of CA | | | | | | | | | | | |
| 19 | $MeCl_2$ | 1294 | 6200 | 250 | 12.2 | 28.6 | 0.4 | 0.01 | 15.5 | 6.7 | 2.31 |
| 20 | $MeCl_2$ | 1348 | 6214 | 275 | 31.0 | 22.5 | 1.5 | 0.07 | 29.7 | 7.9 | 3.76 |
| 21 | $MeCl_2$ | 1402 | 3611 | 300 | 51.1 | 35.3 | 2.9 | 0.08 | 49.9 | 11.4 | 4.38 |
| 22 | $MeCl_2$ | 1258 | 6508 | 350 | 83.9 | 58.9 | 12.7 | 0.22 | 47.7 | 21.4 | 2.23 |
| 23 | $CCl_4$ | 1252 | 4156 | 250 | 79.8 | 66.5 | 4.0 | 0.06 | ND | 43.7 | -0- |
| 24 | $CCl_4$ | 1102 | 14330 | 275 | 89.8 | 72.0 | 4.5 | 0.06 | ND | 60.8 | -0- |
| 25 | TCE | 909 | 13549 | 250 | 53.6 | 47.5 | 0.4 | 0.01 | 33.0 | 15.3 | 2.16 |
| 26 | TCE | 944 | 11544 | 300 | 82.3 | 63.8 | 4.2 | 0.07 | 63.6 | 20.5 | 3.10 |
| Cr-Y/CA double loading of Cr-Y | double loading of CA | | | | | | | | | | |
| 27 | $MeCl_2$ | 1059 | 8652 | 275 | 23.0 | 30.2 | 1.9 | 0.06 | 40.0 | 11.7 | 3.42 |
| 28 | $MeCl_2$ | 997 | 8907 | 300 | 57.5 | 44.7 | 5.0 | 0.11 | ND | 40.8 | -0- |
| 29 | $MeCl_2$ | 969 | 7824 | 350 | 89.5 | 84.6 | 19.6 | 0.23 | ND | 29.6 | -0- |
| 30 | $MeCl_2$ | 1193 | 13930 | 375 | 93.6 | 86.7 | 16.8 | 0.19 | ND | 41.8 | -0- |
| 31 | $CCl_4$ | 1251 | 10452 | 250 | 77.6 | 55.7 | 0.8 | 0.01 | 28.3 | 6.2 | 4.56 |
| 32 | $CCl_4$ | 1248 | 7932 | 275 | 94.8 | 73.0 | 8.0 | 0.11 | 40.1 | 7.8 | 5.14 |
| 33 | TCE | 1001 | 20890 | 250 | 75.4 | 42.1 | NA | | 82.6 | 17.8 | 4.64 |
| 34 | TCE | 979 | 18613 | 300 | 89.5 | 61.7 | 2.0 | 0.03 | 51.7 | 19.3 | 2.68 |
| 35 | TCE | 967 | 9157 | 325 | 94.7 | 6.1 | 13.8 | 2.26 | 67.1 | 25.9 | 2.59 |
| Co-Y | | | | | | | | | | | |
| 36 | $MeCl_2$ | 1051 | 16010 | 300 | 77.2 | 82.5 | NA | | 57.1 | 4.9 | 2.38 |
| 37 | $MeCl_2$ | 824 | 14684 | 250 | 34.4 | 30.8 | NA | | 24.3 | 0.4 | 60.8 |
| 38 | $MeCl_2$ | 722 | 19518 | 300 | 73.0 | 86.4 | NA | | 55.4 | 1.3 | 42.6 |
| 39 | TCE | 761 | 10652 | 250 | 2.1 | 2.0 | NA | | ND | 0.4 | -0- |
| 40 | TCE | 903 | 20299 | 350 | 3.4 | 3.8 | NA | | 11.1 | 1.2 | 9.25 |
| Co-Y/CA | | | | | | | | | | | |
| 41 | $MeCl_2$ | 1273 | 13445 | 250 | 18.6 | 14.6 | NA | | 51.6 | 15.8 | 3.27 |
| 42 | $MeCl_2$ | 1246 | 16076 | 350 | 91.0 | 88.3 | 7.2 | 0.08 | 68.7 | 28.3 | 2.43 |

TABLE 3-continued

| Run # | Feed | Feed Conc. (ppm) | Water Conc. (ppm) | T (°C.) | Reaction (%) | HCl | Cl$_2$ | Cl$_2$/HCl | CO | CO$_2$ | CO/CO$_2$ |
|---|---|---|---|---|---|---|---|---|---|---|---|
| 43 | TCE | 775 | 13882 | 250 | 59.8 | 56.1 | NA | | 23.6 | 2.4 | 9.83 |
| 44 | TCE | 655 | 18572 | 300 | 87.5 | 83.8 | 2.0 | 0.02 | 72.2 | 21.6 | 3.34 |
| Cu-Y | | | | | | | | | | | |
| 45 | MeCl$_2$ | 2087 | 19602 | 300 | 42.4 | 33.1 | NA | | 24.0 | 3.1 | 7.74 |
| 46 | MeCl$_2$ | 1547 | 15644 | 350 | 73.8 | 74.2 | NA | | 77.6 | 3.7 | 21.0 |
| 47 | MeCl$_2$ | 1829 | 12702 | 400 | 98.5 | 86.9 | NA | | 76.6 | 2.8 | 27.36 |
| 48 | TCE | 1348 | 19320 | 250 | 15.3 | 4.1 | NA | | 4.5 | ND | |
| 49 | TCE | 946 | 13897 | 300 | 13.3 | 3.1 | NA | | 10.6 | 0.7 | 15.14 |
| Cu-Y/CA | | | | | | | | | | | |
| 50 | MeCl$_2$ | 1960 | 16863 | 300 | 21.4 | 29.4 | NA | | 7.7 | 3.6 | 2.14 |
| 51 | MeCl$_2$ | 2095 | 16876 | 350 | 58.5 | 60.9 | NA | | 24.7 | 12.9 | 1.91 |
| 52 | TCE | 1297 | 21039 | 250 | 23.4 | 3.3 | NA | | 25.5 | 2.7 | 9.44 |
| 53 | TCE | 1215 | 17008 | 300 | 70.3 | 52.5 | NA | | 38.2 | 9.2 | 4.15 |

The data presented in Table 3 shows that impregnation of a washcoated catalyst support containing either Cr-Y, Co-Y or Cu-Y with CA, greatly increases the activity of the catalysts. Comparing runs 1–9, 10–18, 19–26 and 27–35 impregnation of a CA and double treating with Cr-Y does improve catalytic performance. It is also apparent that impregnation is an extremely effective procedure for enhancing catalytic activity.

Comparing runs 36–40 with 41–44 also shows the substantial improvement that CA impregnation causes, particularly in the case with two-carbon moieties. This same effect is seen in the case of Cu-Y catalyst (runs 45–49 and 50–53).

Looking at the product distribution in Table 3 above, it is also apparent that CA causes increased formation of hydrochloric acid and a mixture of carbon monoxide and carbon dioxide.

It should be recognized that product distribution and conversion are completely controllable by changing temperature, catalyst composition and water content as is apparent from the data reported in the tables. It is also known that residence time within the catalytic bed also affects the product distribution and overall conversion.

Although the chlorinated organics used in Table 3 were restricted to dichloromethane, carbon tetrachloride and TCE, any chlorinated organic, be it volatile or non-volatile, can be oxidized in an analogous fashion, except that higher boiling chlorinated organics may have to be fed by entrainment or by higher inlet temperatures. Also, it should be recognized that when the halogenated organics contain fluorine, then alumina binders are preferred.

The ability of catalysts of this invention to oxidize fluorinated hydrocarbons using catalysts according to Examples 1–6, where the feed contains fluorinated hydrocarbons (CFC's) are summarized in Table 4. The catalyst was prepared as described in Examples 1–4 except that Silbond-H-5™ was replaced with alumina. Table 4 has the run data associated with the catalytic destruction of CFC-11 and CFC-12.

TABLE 4

| | Cr-Y/CA Catalyst (25 wt % Loading) | | | | | |
|---|---|---|---|---|---|---|
| Run | Feed | Feed Conc. (ppm) | T (°C.) | water (ppm) | Conv. (%) | Chlorine balance | Carbon balance |
| 54 | CFC-12 | 1319 | 425 | 1699 | 55.2 | 94.3 | 66.5 |
| 55 | CFC-12 | 1242 | 475 | 1915 | 92.4 | 46.5 | 45.7 |
| 56 | CFC-12 | 1059 | 400 | 1406 | 46.1 | 79.7 | 79.2 |
| 57 | CFC-12 | 1130 | 475 | 1909 | 91.5 | 40.0 | 56.6 |
| 58 | CFC-11 | 394 | 300 | 2215 | 66.0 | 103.1 | 90.0 |
| 59 | CFC-11 | 419 | 400 | 2094 | 99.4 | 96.1 | 53.1 |
| 60 | CFC-11 | 439 | 400 | 2094 | 99.2 | 91.9 | 49.5 |

Runs 54–57 indicate that even a very stable CFC can be easily and readily destroyed using a catalyst according to Example 4 where the exchanging metal and the impregnating metal compound contain chromium as the active catalytic metal. At a temperature of 475° C. approximately 90–95% of CFC-12 is destroyed with high chlorine accountability and reasonably good carbon accountability.

Runs 58–60 show that the present catalyst oxidatively destroys CFC-11 at a lower temperature (400° C.) than CFC-12. This fact is due to the stability difference between CFC-12 and CFC-11. The conversion is nearly quantitative at 400° C. with good chlorine and carbon balance. No fluorine analysis is available for these runs because fluorine is a very difficult element to detect and existing analytical techniques are still wanting.

While the results indicate the effective oxidative capability of metal-exchanged, metal-impregnated zeolite-based catalysts for the destruction of VOCs, the CO/CO$_2$ ratio in the effluent is determined to a large degree by the operating temperature. What is unanticipated is that this CO/CO$_2$ ratio can be selectively modified through the incorporation of multiply impregnated ions in the zeolite-based catalyst or by the incorporation of multiply exchanged ions in the zeolite-based catalyst or by the simultaneous application of both techniques. In addition to the selective modification of the $CO/CO_2$ ratio, it has additionally been found that it is possible to selectively modify the $Cl_2/HCl$ ratio.

As shown in the following Table 5, a series of reaction runs were performed using TCE as the feedstock, and operating temperatures between 275° C. and 350° C., on three catalytic systems: (1) Cr-Y/Co base case catalyst; (2) Cr-Y/Pt/Co multiply metal-impregnated catalyst with a single exchanged metal in the zeolite; and (3) Cr-Pt-Y/Co multiply metal-exchanged catalyst with a single impregnating metal.

Figure 7:
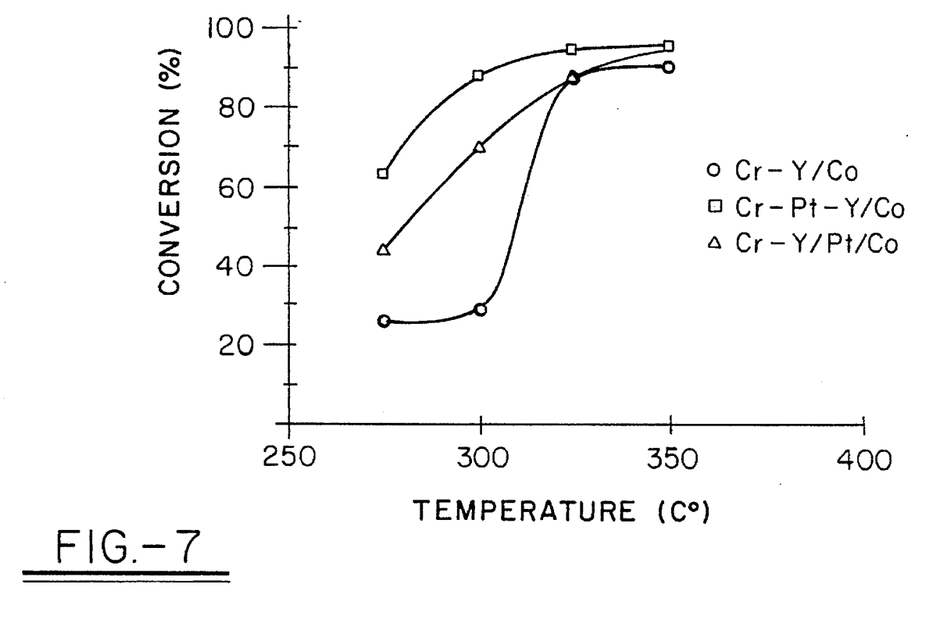
FIG. 7 is a plot of TCE conversion vs. temperature for various catalysts pellets at a space velocity of $2440^{-1}$/hr.

FIG. 7 is a graphical representation of the data contained in runs #61–64 in Table 5. It represents the state-of-the-art as defined by U.S. patent application Ser. No. 08/001,398 by Greene et al., the application hereinby being fully incorporated by reference. The catalyst is active even at temperatures as low as 275° C. and indicates that a three-fold variation in the magnitude of the $CO/CO_2$ ratio is possible, mainly due to the influence of temperature.

Additionally shown in FIG. 7 is a curve representing the data contained in runs #54–68 in Table 5. This information shows that the activity of the catalyst can be improved by the addition of a second impregnating ion (i.e., Pt) in the catalyst formulation, thereby permitting the effective catalytic operation at even lower temperature than previously believed to be commercially viable.

The last curve shown in FIG. 7 represents the data contained in runs #69–72 in Table 5. This information indicates that the activity of the catalyst can be still further improved by the addition of a second exchanged ion (i.e., Pt) in the catalyst formulation, thereby permitting even further effective catalytic operation at still lower temperatures than with the previously described mutiply impregnated catalyst.

Figure 8:
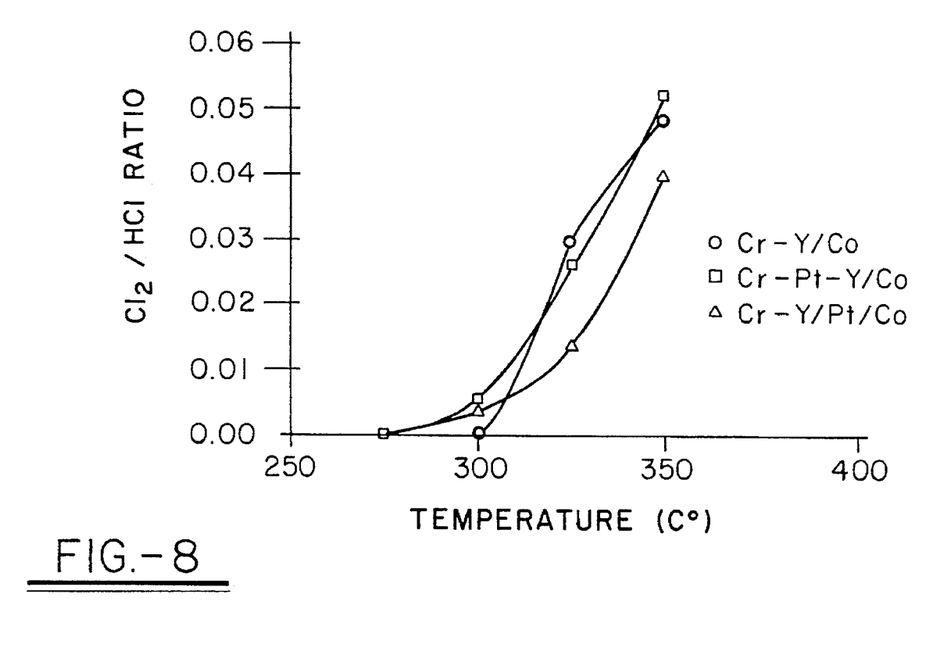
FIG. 8 is a plot of the $Cl_2/HCl$ ratio vs. temperature for the catalysts used in FIG. 7 for the oxidation of TCE at a space velocity of $2440^{-1}$/hr.

FIG. 8 illustrates the ability to control the $Cl_2/HCl$ ratio through the use of the various multiply impregnated and/or exchanged catalysts of the invention. In either the composition of the multiply impregnated catalyst or the multiply exchanged catalyst, the temperature at which breakthrough $Cl_2$ was detected, was at least 25° C. lower than with that previously possible. Breakthrough $Cl_2$ is a serious problem in many commercial environments, requiring the use of alkali scrubbers, which significantly add to the operating expense of the system.

Figure 9:
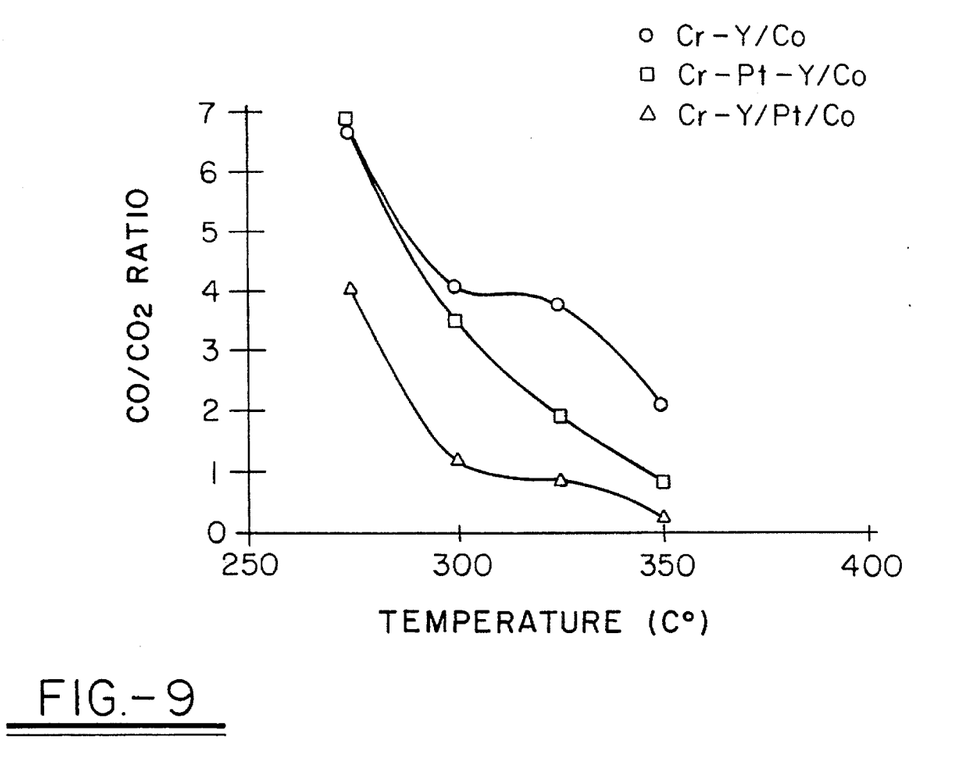
FIG. 9 is a plot of $CO/CO_2$ ratio vs. temperature for the catalysts used in FIG. 7 for the oxidation of TCE at a space velocity of $2440^{-1}$/hr.

FIG. 9 graphically represents the ability of the catalysts of the invention to dramatically alter the composition of the $CO/CO_2$ ratio in the final effluent gas composition. While an approximately 3-fold variation was possible using the Cr-Y/Co base case catalyst, due primarily to temperature variation, the ratio was reduced by a factor of 10 in the case of the multiply metal-impregnated catalyst, and by a factor of 2.5 in the case of the multiply metal-exchanged catalyst at the higher operating temperatures.

Through the selection of appropriate exchanging metals and appropriate impregnating metals and combinations thereof, the composition of the effluent stream of the process can be tailored to meet the demands of downstream processing equipment without the need to alter upstream temperature profiles.

In particular, it has been found effective that Co impregnation is effective in improving one-carbon performance, and that the incorporation of Pt, promotes $CO_2$ production.

In a preferred embodiment of this invention, the incorporation of Pd for Cr in the exchanging reaction hs been found to be particularly advantageous. With ever tightening regulations regarding Cr, Pd is one of only a few elements which is effective in the oxidative degradation of two carbon VOCs, including TCE. In fact, when using Pd, no chlorine is observed in the effluent, a highly desirable result. Catalysts which are effective for the Deacon reaction, are typically candidates which favor $Cl_2$ formation, while those catalysts which are not particularly well-suited for the reaction, such as Pd, minimize, and in some cases, eliminate the formation of $Cl_2$. The results of such experimentation are shown in Table 6, the results for which were tabulated at a space velocity of 2440 $hr^{-1}$.

TABLE 5

| Run # | Feed | Feed Conc. (ppm) | Water Conc. (ppm) | T (°C.) | Reaction (%) | Chlorine balance | Carbon balance | $CO/CO_2$ | $Cl_2HCl$ |
|---|---|---|---|---|---|---|---|---|---|
| Cr-Y/Co | | | | | | | | | |
| 61 | TCE | 962 | ~13,000 | 350 | 91.0 | 100.0 | 86.0 | 2.1 | 0.05 |
| 62 | TCE | 1314 | ~13,000 | 325 | 88.1 | 75.0 | 89.0 | 3.8 | 0.03 |
| 63 | TCE | 824 | ~13,000 | 300 | 29.0 | 111.0 | 116.0 | 4.1 | -0- |
| 64 | TCE | 962 | ~13,000 | 275 | 26.0 | 97.0 | 98.0 | 6.7 | -0- |
| Cr-Y/Pt/Co | | | | | | | | | |
| 65 | TCE | 924 | 11,986 | 350 | 95.9 | 120.2 | 107.9 | 0.26 | 0.04 |
| 66 | TCE | 747 | 11,823 | 325 | 88.3 | 143.9 | 112.7 | 0.87 | 0.01 |
| 67 | TCE | 704 | 12,055 | 300 | 70.1 | 124.4 | 82.1 | 1.19 | -0- |
| 68 | TCE | 881 | 14,293 | 275 | 43.8 | 128.6 | 119.9 | 4.04 | -0- |
| Cr-Pt-Y/Co | | | | | | | | | |
| 69 | TCE | 1182 | 11,955 | 350 | 96.2 | 92.6 | 95.6 | 0.86 | 0.05 |
| 70 | TCE | 922 | 11,661 | 325 | 95.0 | 91.9 | 103.6 | 1.94 | 0.0 |
| 71 | TCE | 1113 | 11,852 | 300 | 88.6 | 91.5 | 98.1 | 3.49 | 0.01 |
| 72 | TCE | 1058 | 11,852 | 275 | 63.4 | 101.9 | 117.8 | 6.88 | -0- |

TABLE 6

| Run # | Feed | Feed Conc. (ppm) | Water Conc. (ppm) | T (°C.) | Reaction (%) | $CO/CO_2$ | $Cl_2/HCl$ |
|---|---|---|---|---|---|---|---|
| Cr-Y/Co | | | | | | | |
| 73 | TCE | 962 | ~13,000 | 350 | 91 | 2.1 | 0.05 |
| 74 | TCE | 1314 | ~13,000 | 325 | 88 | 3.8 | 0.03 |
| 75 | TCE | 824 | ~13,000 | 300 | 29 | 4.1 | -0- |
| 76 | TCE | 962 | ~13,000 | 275 | 26 | 6.7 | -0- |
| Pd-Y/Co | | | | | | | |
| 77 | $MeCl_2$ | 1976 | 10,311 | 350 | 99 | 0.4 | -0- |
| 78 | $MeCl_2$ | 2088 | 10,311 | 300 | 97 | 1.0 | -0- |
| 79 | $MeCl_2$ | 2236 | 10,246 | 250 | 78 | 2.4 | -0- |
| 80 | TCE | 1127 | 11,268 | 350 | 97 | 0.3 | -0- |
| 81 | TCE | 1356 | 11,680 | 300 | 90 | 0.6 | -0- |
| 82 | TCE | 1418 | 11,972 | 250 | 83 | 0.8 | -0- |

While in accordance with the patent statutes the best mode and preferred embodiment of the invention have been described, it is to be understood that the invention is not limited thereto, but rather is to be measured by the scope and spirit of the appended claims.

What is claimed is:

1. A process for the destruction of halogenated organic compounds comprising the step of contacting the compounds with an oxygen-containing gas in the presence of a catalyst comprising:

(a) a metal-exchanged, metal-impregnated aluminosilicate zeolite wherein
        (i) at least one exchanged metal in the zeolite is selected from the group consisting of Ti, V, Cr, Co, Ni, Cu, Fe, Mo, Mn, Pd, and Pt, and
        (ii) at least one impregnated metal in the zeolite is selected from the group consisting of Ti, V, Cr, Mn, Fe, Co, Ni, Cu, Mo, Pd and Pt, and wherein the difference between the exchanged metal and the impregnated metal varies a temperature necessary to promote oxidation of the compounds and for a contact time sufficient to oxidize the compounds.

2. The process of claim 1 wherein the temperature is from about 100° C. to about 650° C. and the contact time is from about 0.01 to 20 seconds.

3. The process of claim 2 wherein the temperature is from about 150° C. to about 450° C. and the contact time is from about 0.1 to 1.0 seconds.

4. The process of claim 1 wherein the catalyst contains a support.

5. The process of claim 4 wherein the support is selected from the group consisting of alumina, aluminum oxide, silica, silicates, silica-aluminas, titanias, zeolites, polymeric supports, carbon and cordierite.

6. The process of claim 5 wherein the support is a honeycomb support.

7. The process of claim 1 wherein the catalyst contains a binder.

8. The process of claim 7 wherein the binder is selected from the group consisting of alumina, silica, alumina-silica, cordierite, titania, zirconia, vanadia, zeolites and other inorganic materials used as binding agents.

9. The process of claim 1 wherein the catalyst comprises from about 0.2 wt. % to 12 wt. % of at least one impregnating metal and from about 10 wt. % to 95 wt. % of the metal-exchanged aluminosilicate zeolite.

10. A process for the destruction of halogenated organic compounds comprising the step of contacting the compounds with an oxygen-containing gas in the presence of a catalyst comprising:

(a) a metal-exchanged, metal-impregnated aluminosilicate zeolite wherein
        (i) at least one exchanged metal in the zeolite is selected from the group consisting of Ti, V, Cr, Co, Ni, Cu, Fe, Mo, Mn, Pd, and Pt, and
        (ii) at least one impregnated metal in the zeolite is selected from the group consisting of Ti, V, Cr, Mn, Fe, Co, Ni, Cu, Mo, Pd and Pt, and wherein the difference between the exchanged metal and the impregnated metal varies a temperature necessary to promote oxidation of the compounds and for a contact time of about 0.2 to 1.0 seconds, sufficient to oxidize the compounds, and to permit the selective modification of the $CO/CO_2$ ratio and the $Cl_2/HCl$ ratio of the process without changing the temperature by the selective incorporation of at least two exchanged metals with at least one impregnated metal in the zeolite or the selective incorporation of at least one exchanged metal with at least two impregnated metals in the zeolite.

11. The process of claim 10 wherein the temperature is from about 100° C. to about 650° C. and the contact time is from about 0.01 to 20 seconds.

12. The process of claim 11 wherein the temperature is from about 150° C. to about 450° C. and the contact time is from about 0.1 to 1.0 seconds.

13. The process of claim 10 wherein the catalyst contains a support.

14. The process of claim 13 wherein the support is selected from the group consisting of alumina, aluminum oxide, silica, silicates, silica-aluminas, titanias, zeolites, polymeric supports, carbon and cordierite.

15. The process of claim 14 wherein the support is a honeycomb support.

16. The process of claim 10 wherein the catalyst contains a binder.

17. The process of claim 16 wherein the binder is selected from the group consisting of alumina, silica, alumina-silica, cordierite, titania, zirconia, vanadia, zeolites and other inorganic materials used as binding agents.

18. The process of claim 10 wherein the catalyst comprises from about 0.2 wt. % to 12 wt. % of at least one impregnating metal and from about 10 wt. % to 95 wt. % of the metal-exchanged aluminosilicate zeolite.

\* \* \* \* \*